United States Patent [19]

Liu et al.

[11] Patent Number: 4,673,454

[45] Date of Patent: Jun. 16, 1987

[54] PROCESS FOR PREPARING BIPOLAR MEMBRANES

[75] Inventors: Kang-Jen Liu, Bridgewater; Ho-Lun Lee, New Providence, both of N.J.

[73] Assignee: Chinese Petroleum Corp., Taipei, Taiwan

[21] Appl. No.: 773,680

[22] Filed: Sep. 9, 1985

Related U.S. Application Data

[62] Division of Ser. No. 554,792, Nov. 23, 1983, Pat. No. 4,584,246.

[51] Int. Cl.$^4$ .............................................. B32B 31/00
[52] U.S. Cl. .................................. 156/281; 156/246; 156/315; 427/340; 521/27
[58] Field of Search ....................... 156/246, 315, 281; 427/340; 521/27

[56] References Cited

U.S. PATENT DOCUMENTS

| 3,945,927 | 3/1976 | Imai et al. | 427/340 |
| 4,116,889 | 9/1978 | Chlanda et al. | 521/27 |
| 4,258,900 | 3/1981 | Dege et al. | 428/327 |

FOREIGN PATENT DOCUMENTS 1038777  8/1966  United Kingdom .

Primary Examiner—John J. Gallagher
Attorney, Agent, or Firm—Bert J. Lewen; Henry Sternberg

[57] ABSTRACT

An improved bipolar membrane, a precursor for said membrane and a process for preparing bipolar membranes and precursors are described. In the process a precursor is formed by laminating at least two polymeric layers at least one of which is non-ionic. After the formation of the precursor, the non-ionic layer or layers are chemically treated to form a stable bipolar membrane having high permselectivity and low potential drop. The novel bipolar membrane contains an interfacial layer having anionic and cationic domains.

12 Claims, 3 Drawing Figures

PROCESS FOR PREPARING BIPOLAR MEMBRANES

This is a divisional of co-pending application Ser. No. 554,792 filed on Nov. 23, 1983, now U.S. Pat. No. 4,584,246.

BACKGROUND OF THE INVENTION

Bipolar membranes are known to be useful for their ability to rectify alternating current, to improve desalination processes, to act as biological membranes, and to produce acids and bases from salts. This latter property has great potential usefulness, since it allows the production of commercially important acids and bases from readily available neutral salts, e.g., the formation of HCl and NaOH from table salt. The potential for carrying out this type of conversion by means of bipolar membranes, a process known as electrodialytic water-splitting, has not yet become an industrial process, primarily because of deficiencies in the properties of the bipolar membranes themselves and the difficulty of fabricating bipolar membranes having reproducible properties on a large scale.

Many bipolar membranes prepared by various procedures have been reported in the literature. Initially, bipolar membranes were prepared by bonding together polymer layers containing ion-exchange resin particles of opposite charges, as described for example in U.S. Pat. No. 2,829,095. The fusion of conventional anion and cation transfer membranes (described for example in U.S. Pat. Nos. 2,731,411 and 2,860,097) by heat and pressure to yield bipolar membranes was also reported, as in U.S. Pat. No. 3,372,101 and British Pat. No. 1,038,777. Preparation of bipolar membranes from a single sheet of polymeric material by selective functionalization of one side to give anion or cation permeability and the other side permeability to ions of the opposite charge was described in U.S. Pat. Nos. 3,388,080 and 3,654,125, as well as later U.S. Pat. Nos. 4,024,043, 4,057,481 and 4,140,815. Although the bipolar membranes prepared by these later methods have the desired properties of (i) Good mechanical strength,
(ii) High permselectivity,
(iii) Low membrane voltages,
(iv) Stability, and
(v) Operability at high current density, quality control is poor, particularly on a large scale, primarily due to the difficulty in controlling the diffusion into and reaction of reagents with the film. While such diffusion and reaction control is possible with small, carefully selected uniform film, the non-uniformity inherent in large films and the strict requirements for diffusion and reaction control make large-scale manufacturing of the membranes quite difficult.

Another approach to making high-performance bipolar membranes with the desired properties listed above may be found in U.S. Pat. No. 4,116,889. Unfortunately, fabrication of such membranes has proven difficult because the formation of a uniform, fault-free, anion permeable layer by solution casting of a polymer system which is undergoing gelation requires careful control of the physical properties of the polymer, the mixing conditions, the casting process, and the gelation and drying times. Deviations from these controls may lead to permanent scratches by the casting knife, non-uniform thickness and composition of the layer, and cracking. Accordingly, the fabrication of bipolar membranes which depends on the control of the formation of homogenous polymer gels is difficult to practice where large-scale manufacturing is contemplated.

In summary, the prior art has not been able to fabricate a high-performance bipolar membrane, one which possesses the desired properties listed above, which can be prepared by a straightforward and reliable procedure.

SUMMARY OF THE INVENTION

In accordance with the invention, it has been discovered that the aforesaid problems encountered in the prior art for preparing bipolar membranes may be overcome by forming first a bipolar membrane precursor consisting of a laminate having at least one non-ionic layer and then converting this precursor into a bipolar membrane. The membrane precursors can be readily prepared using conventional technology for the preparation of polymer films such as film-casting and lamination. The process is easily controlled, since a high degree of process variations can be tolerated. Most significantly, the membranes prepared in accordance with the invention have good mechanical strength and satisfy the requirements of low energy consumption, high permselectivity, long-term stability and operability at high current densities without burn-out.

In brief compass, the process of the invention comprises forming as the first of at least two layers, an ion-exchange layer consisting either of an ion-exchange resin embedded in a polymeric matrix (a heterogeneous ion-exchange layer) or of a crosslinked polymer gel or entangled polymer blends containing ion-exchange groups (a homogeneous ion-exchange layer). For this first layer, substantially any organic or inorganic layer or resin with ion-exchange capacity may be used. A second layer, which also may be organic or inorganic, but which has no ion-exchange capacity (the non-ionic layer), is then bonded or joined to the ion-exchange layer. The resulting composite film formed from such ion-exchange and non-ionic layers is not, in and of itself, a bipolar membrane, but rather merely a precursor of such a membrane.

It is an essential feature of the invention that the non-ionic layer be chemically reactive and have the potential to be later converted to an ion-exchange layer by treatment with suitable chemical reagents. The bonding or joining of the two layers may be accomplished by any conventional means, such as fusion through heat and pressure, solution, adhesives, or solution-casting of one layer upon the other.

After its formation, the precursor is contacted with suitable reagents which react with the chemically reactive non-ionic layer(s) to form eventually layer(s) containing ion-exchange groups or capacities.

A further modification of the process of the present invention consists of forming first a multilayer laminate having all neutral layers and then converting the layers on one side of the laminate into either cation or anion-exchange layer(s). The resulting composite then becomes the bipolar membrane precursor as described above.

A further embodiment of the instant invention is a new bipolar membrane which contains at least one interfacial layer between the anion-transfer layer and the cation-transfer layer. The interfacial layer contains ion-exchange resin dispersed in a homogeneous, fixed polymer matrix having ionic groups of a charge opposite to that of the ion exchange resin. Such membrane, surprisingly, exhibits improved performance over those membranes of the prior art in which such interfacial layer is absent.

DETAILED DESCRIPTION OF THE INVENTION

The advantages of the invention may be achieved most simply by forming a composite film containing one non-ionic layer and one ionic layer. For example, a bipolar membrane precursor can be formed by first casting a film from a mixture of a polymer such as polyvinyl chloride with crosslinked divinylbenzene (DVB)-vinylbenzyl chloride (VBC) resin in a suitable solvent such as dimethylformamide (DMF) on a glass plate and evaporating the solvent in an oven. A thin coating of a DMF solution of cation-exchange resin in a matrix polymer such as polyvinyl chloride can then be applied. The bipolar membrane precursor which results following drying is then treated with an amine, such as trimethylamine, which reacts with the benzyl chloride groups in the first layer to form anion-exchange groups as follows:

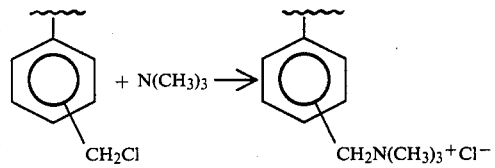

ps The membrane thus becomes a bipolar membrane, having an anion-permeable layer on one side and a cation-permeable layer on the other. Alternatively, crosslinked polystyrene can be used as the non-ionic layer in the precursor. A polyvinylbenzyl chloride crosslinked by polyamines or diamines acting as the anion-exchange layer may then be cast upon the polystyrene. The precursor can then be sulfonated by well-known procedures to give bipolar membranes. See Friedrich Helferrich, *Ion Exchange* (McGraw-Hill, New York, 1962) for a description of sulfonation procedures.

Figure 1:
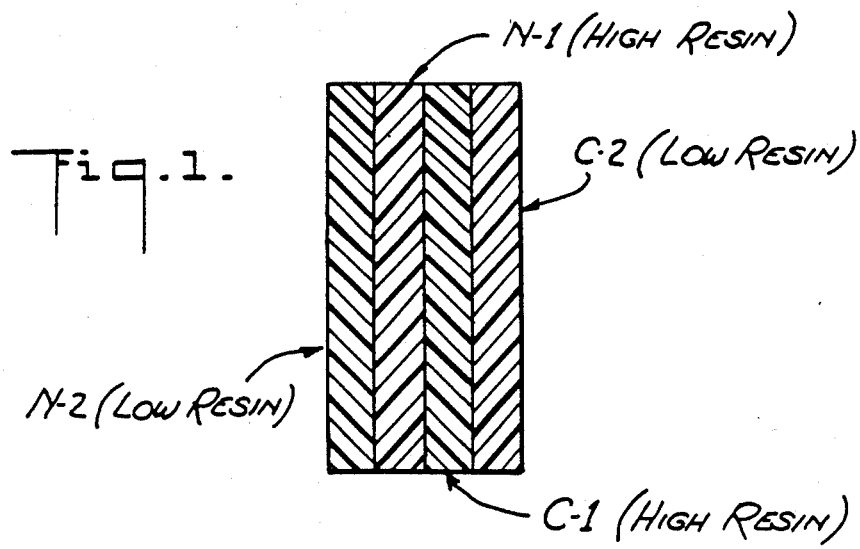
FIG. 1 illustrates a bipolar membrane precursor made by the process of the invention.

In order to improve the membrane performance (particularly its permselectivity) and its mechanical strength, it is often desirable to form a multilayered structure. Such a structure is depicted in FIG. 1. For example, following the casting of the low resin content neutral layer (N-2) of divinylbenzene-vinylbenzyl chloride resin in polyvinyl chloride, a coating of a second high resin content neutral layer (N-1) containing the same resin in a vinylbenzyl chloride-styrene copolymer may be applied, followed by a high resin layer (C-1) of cation-exchange resin in a vinylbenzyl chloride-styrene copolymer. After these, the low resin layer (C-2) of cation-exchange resin in polyvinyl chloride is cast. This membrane precursor may then be converted to bipolar membranes by amination. Layers N-1 and N-2 are converted to anion exchange layers and a bipolar membrane is formed. The resulting membrane has lower potential drops, as compared to the membranes without the additional coatings N-1 and C-1. The membranes may also be cast onto some reinforcing fabrics such as polypropylene cloth or scrims for improved strength.

Another embodiment of the subject invention is bipolar membranes containing an interfacial layer between the anion exchange layer and the cation exchange layer and membrane precursors therefor. The interfacial layer contains intermingled anion transfer domains and cation exchange resins. Such membranes are effective and have a particularly low potential drop.

The efficacy of the foregoing membranes is particularly surprising because prior to the invention it was believed that, to obtain low potential drop, significant interpenetration of the oppositely charged ion-exchange groups had to be avoided. See U.S. Pat. No. 4,116,889, column 4.

Figure 2:
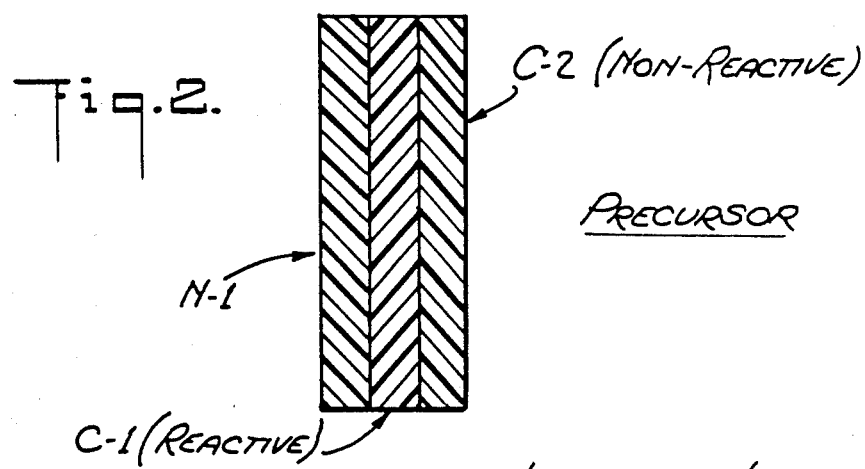
FIG. 2 shows a bipolar membrane precursor of the invention containing a reactive and a non-reactive cation exchange layer.
Figure 3:
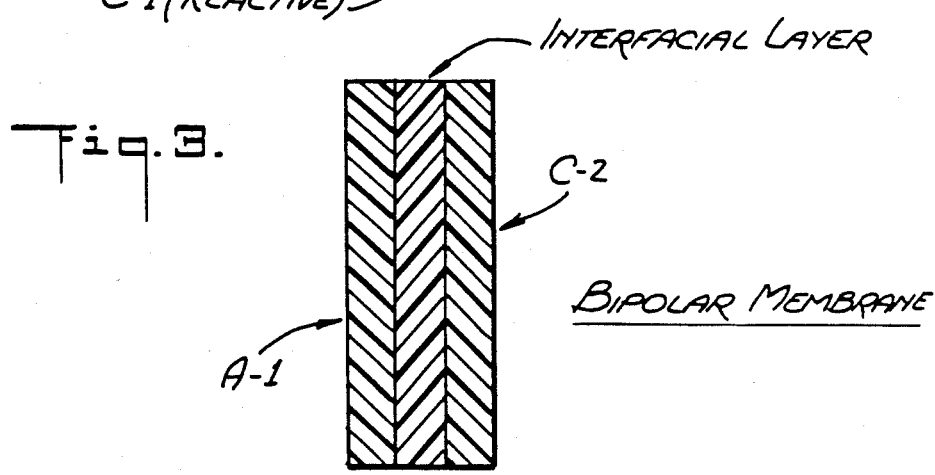
FIG. 3 depicts the bipolar membrane of the invention containing an interfacial layer having both anionic and cationic domains.

FIG. 2 illustrates the membrane precursor in accordance with this embodiment of the invention. In this case, a neutral layer N-1 containing a polymer or copolymer of vinylbenzyl chloride is cast and dried. Thereafter, a C-1 layer containing a cation-exchange resin and a matrix having functional groups which can be converted to anion exchange domains is formed on the N-1 layer. After drying, the final C-2 layer is cast. The latter layer, in contrast to the C-1 layer, is non-reactive, i.e., is substantially inert to the reagent used to form the anion exchange layers. Accordingly, after amination the bipolar membrane depicted in FIG. 3 is formed. The previously neutral layer (N-1 in FIG. 2) becomes the anion-exchange A-1 layer, and the reactive C-1 layer of FIG. 2 becomes the interfacial layer of FIG. 3. Examples of a nonreactive C-2 layer would include those containing PVC or PVC-olefin copolymer matrices. An example of a reactive C-1 layer would be one containing a vinylbenzyl chloride-styrene copolymer matrix.

As examples of non-ionic layers, one may use divinylbenzene-vinylbenzyl chloride resin particles embedded in a polymer matrix such as polyvinyl chloride, polyvinylidene fluoride, nylon, polysulfone, polystyrene; a polymer film such as polyethylene, polypropylene or polytetrafluoroethylene impregnated with divinyl benzene and styrene or vinylbenzyl chloride which are then polymerized; a polymer film or screen or scrim imbibed with styrene which is then polymerized and crosslinked by radiation such as gamma rays or electron beam; a polystyrene film crosslinked by the aforesaid radiation; and a layer of polymer or copolymer of vinylbenzyl chloride.

Various other ion-exchange layers can also be used. As examples, one may use a layer of polymer such as polyvinylchloride or polyvinylidene fluoride containing ion-exchange resin particles, such as divinylbenzene-styrene latices prepared by emulsion copolymerization and then sulfonated or divinylbenzene-vinylbenzyl chloride latices prepared by emulsion polymerization and then aminated. Alternatively one may also use a sulfonated crosslinked polystyrene sheet; a layer formed by mixing and reacting a polymer or copolymers of vinylbenzyl chloride with polyamines such as tetraethylenepentamine or with diamines such as N,N-dimethyl-1,3-propanediamine or others given below; or a layer formed by mixing and reacting formaldehyde with polyamines or diamines such as those given below.

Examples of ion-exchange groups which may be introduced into the non-ionic polymers are as follows:

(i) Non-ionic polymers containing polymerized styrene

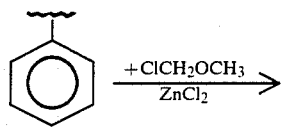
(A)

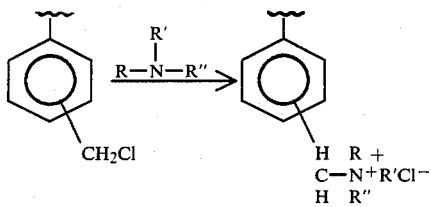

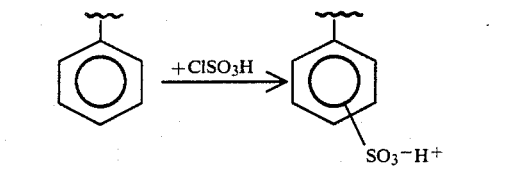
(B)

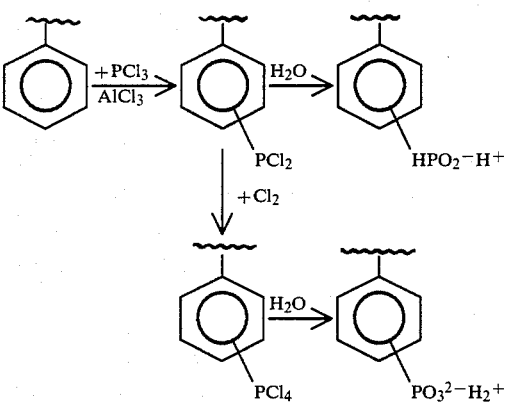

(ii) Non-ionic polymers containing polymerized vinylbenzyl chloride

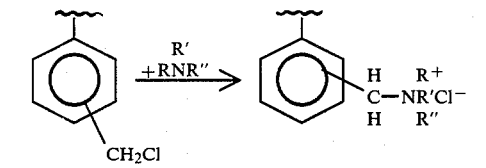
(A)

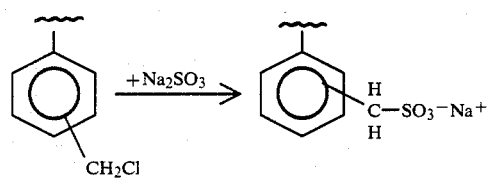

(iii) Non-ionic polymers containing polymerized acrylates

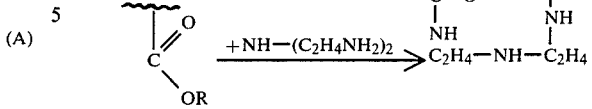
(A)

(iv) Non-ionic polymers containing polymerized acrylonitrile

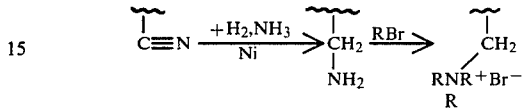

(v) Non-ionic polymers containing polymerized vinyl alcohol

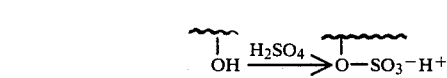

Examples of amines useful in some of the transformations described above are: tertiary amines such as trimethylamine, triethylamine or dimethylethanolamine, secondary amines such as N-methylpropylamine, primary amines such as n-propylamine or n-butylamine, diamines such as N,N-dimethyl-1,3-propanediamine, N,N,N',N'-tetramethylxylenediamine, N,N-dimethylbutanediamine, N,N,N',N'-tetramethyl-1,6-hexanediamine, or N-methylpiperazine, and polyamines such as diethylenetriamine or tetraethylene pentamine. The symbols R, R' and R" are used to indicate organic radicals such as lower alkyl groups, e.g., $CH_3-$, $C_2H_5$.

The following Examples I to V illustrate the process of the present invention. Examples III to V also describe novel bipolar membranes with the unique interfacial layer and their precursors.

PREPARATION OF POLYMERS

A. Cation Exchange Resin (Resin A)

Four hundred cc. of distilled water was boiled in a 1 liter three-neck distillation flask under a nitrogen gas sweep. It was then cooled to room temperature, and 6 g. of sodium lauryl sulfate was added and stirred into a solution. A mixture of 70 g. styrene and 40 g. of 55% commercial divinylbenzene was added, followed by 1 g. of $K_2S_2O_8$. The reaction mixture was then heated to 60° C. and held at this temperature for 3 hours. Following polymerization the resin was coagulated in 10% sodium chloride solution, filtered, washed with distilled water, washed with methanol, and dried.

Twenty g. of the dried resin was dispersed in 200 cc. dichloroethane and added slowly to a mixture of 120 cc. dichloroethane and 80 cc. chlorosulfonic acid with vigorous agitation. The sulfonation reaction was allowed to proceed for 1 hour, after which the reaction mixture was poured into 1 liter of crushed ice, stirred and filtered. The slimy filter cake was then suspended in distilled water and boiled to drive off the dichloroethane. The resin, after having been filtered, resuspended in distilled water, and refiltered, was dried and redispersed in N,N-dimethylformamide (DMF). This resin was used as the cation-exchange resin for the following Examples.

B. Crosslinked Divinylbenzene-Vinylbenzyl Chloride Resin (Resin B)

Four hundred cc. of distilled water was boiled in a 1 liter three-neck flask under nitrogen. It was then cooled to room temperature and 6 g. of sodium lauryl sulfate was stirred in, followed by a mixture of 65 g. vinylbenzyl chloride and 35 g. of a 77.9% commercial divinylbenzene, and then 1 g. $K_2S_2O_8$. The reaction mixture was heated to 60° C. and held at this temperature for 3 hours. The resin thus prepared by emulsion polymerization was coagulated in 10% sodium chloride solution, filtered, and washed with distilled water and then with methanol. Following washing, the resin was dried in a forced-convection oven at room temperature. The dry resin was dispersed in DMF for use in membrane preparation.

C. Vinylbenzyl Chloride-Styrene Copolymer (Resin C).

Four hundred cc. distilled water was boiled in a 1 liter three-neck flask under nitrogen gas and then cooled to room temperature. Six g. of sodium lauryl sulfate was added and stirred to form a solution. The solution was further cooled to 15° C., and a mixture of 39 g. vinylbenzyl chloride and 61 g. styrene was added with vigorous agitation, followed by 1 g. of $K_2S_2O_8$ and 1 g. of $Na_2S_2O_5$. The mixture was heated slowly to 35° C. and held at this temperature overnight. The resultant copolymer latex was coagulated in 10% NaCl solution, filtered, and washed with distilled water and then with methanol. The wet copolymer was then dried at room temperature in a forced-convection oven. A solution of the vinylbenzyl chloride-styrene copolymer in DMF was then prepared for membrane casting.

D. Crosslinked Divinylbenzene-Vinylbenzyl Chloride Resin (Resin D).

This resin was prepared following essentially the same procedure as Resin B above, except that a mixture of 90 g. vinylbenzyl chloride and 10 g. of 55% commercial divinylbenzene was used instead of the monomer mixture described therein and polymerization was conducted at 70° C. for 1 hour and 30 min.

EXAMPLE I

A 15 mil thick layer of a mixture of 6% w/w of polyvinyl chloride (PVC) and 9% w/w of the divinylbenzene-vinylbenzyl chloride Resin B in DMF was cast on a glass plate by means of a doctor blade and dried in a forced-convection oven at 125° C. for 12 minutes. The film was removed from the oven and a mixture of 3.75% w/w PVC and 11.25% w/w of the divinylbenzene-vinylbenzyl chloride Resin B in DMF was coated on the first film. After drying in the oven for 3 minutes, the film was coated again with a mixture of 6% w/w PVC and 6% w/w of cation-exchange resin in DMF. After drying for an additional 3 minutes at 125° C., the plate was removed from the oven and a mixture of 7.4% w/w PVC and 2.6% w/w of cation-exchange Resin A in DMF was cast by means of a doctor blade to a thickness of 22 mil above the glass plate. The composite was further dried in the oven for 6 minutes, removed, cooled to room temperature, and soaked free of the glass plate in water.

The membrane thus prepared was then immersed in a 24% aqueous solution of trimethylamine. Following amination for about 7 days, the membrane was removed and washed free of the amine. A mechanically strong membrane was obtained. It was then tested in a test cell with a pair of Luggin tips (agar gel saturated with KCl) situated across the membrane to measure potential drops. With 1N $Na_2SO_4$ solution circulating in the cell and under a current density of 100 amp/ft$^2$, the potential drop across the membrane (after the proper correction of the voltage contribution from the solution) was determined to be above 1.8 volts. Furthermore, acid and base were produced during the passage of electric current through the membrane, evidencing that the membrane is indeed bipolar.

EXAMPLE II

A 15 mil thick layer of a mixture of 5% w/w PVC in DMF and 10% w/w of the divinylbenzene-vinylbenzyl chloride Resin D was cast onto a glass plate by means of a doctor blade. The cast film was dried in a forced-convection oven at 125° C. for 12 minutes. After the film was removed from the oven, a mixture of 3.75% w/w of vinylbenzyl chloride-styrene copolymer (Resin C) and 11.25% of the divinyl benzene-vinylbenzyl chloride Resin D in DMF was coated on the film. After drying in the oven at 125° C. for 3 minutes, the film was coated with a mixture of 6% w/w of the copolymer and 6% w/w cation-exchange resin in DMF. Upon further drying at 125° C. for 3 minutes, the plate was removed from the oven and a layer of a mixture of 7.4% w/w PVC and 2.6% w/w cation-exchange Resin A in DMF was cast thereon by means of a doctor blade to a total thickness of 22 mil for the combined layers. The composite was dried further in the oven for 6 minutes, removed, cooled, and soaked free of the glass plate in water.

After the bipolar membrane precursor thus prepared was rinsed further with distilled water, it was immersed in a mixture of 100 cc. distilled water and 50 cc. acetone. The membrane was allowed to swell for about 15 minutes. Five g. of a mixture of N,N-dimethyl-1,3-propanediamine (DMPDA) and N,N,N',N'-tetramethyl-1,6-hexanediamine (TMHDA) in a molar ratio of 1:1 was then added to the acetone solution, and amination was allowed to proceed for 1 day. After amination, the membrane was rinsed thoroughly with distilled water. A mechanically strong membrane was obtained and its potential drop was determined to be about 1.2 volts at 100 amp/ft$^2$ when measured in 1N $Na_2SO_4$ solution. Acid and base were produced during the operation.

EXAMPLE III

A 15 mil thick layer of a mixture of 5% w/w PVC and 10% w/w of the divinylbenzene-vinylbenzyl chloride Resin D in DMF was cast onto a glass plate by means of a doctor blade. The cast film was dried in a forced-convection oven at 125° C. for 12 minutes. After the film was removed from the oven, a mixture of 3.75% w/w of the vinylbenzyl chloride-styrene copolymer (Resin C) and 11.25% w/w of the divinylbenzene-vinylbenzyl chloride Resin D in DMF was coated on the film. After drying in the oven at 125° C. for 3 minutes, the first film was coated again with a mixture of 6% w/w of the copolymer and 6% w/w cation-exchange Resin A in DMF. After drying in the oven at 125° C. for an additional 3 minutes, the plate was removed and a mixture of 7.4% w/w PVC and 2.6% w/w cation-exchange Resin A in DMF was cast by means of a doctor blade to a thickness of 22 mil for the combined layers. The whole film composite was dried further in the oven for 6 minutes, removed, cooled, and soaked free of the glass plate in water.

The membrane thus prepared was rinsed further with distilled water and immersed in a mixture of 100 cc.

water and 50 cc. acetone. The membrane was allowed to swell for about 15 minutes. Five g. of a mixture of DMPDA and TMHDA in a molar ratio of 3:1 was then added to the acetone solution, and amination was allowed to proceed for one day. After amination, the membrane was rinsed thoroughly with distilled water. A mechanically strong membrane was obtained. It was then placed in the test cell for determination of its water-splitting potential. In 1N $Na_2SO_4$ solution the potential drop across the membrane was about 1.2 volts at a current density of 100 amp/ft$^2$. Acid and base were produced during the operation.

EXAMPLE IV

A 15 ml thick layer of a mixture of 5% w/w PVC and 10% w/w of the divinylbenzene-vinylbenzyl chloride Resin D was cast onto a glass plate by means of a doctor blade. The cast film was dried in a forced-convection oven at 125° C. for 12 minutes. The film was removed from the oven and a mixture of 3.75% w/w PVC and 11.25% w/w of the divinylbenzene-vinylbenzyl chloride Resin D was coated on the film. After drying in the oven at 125° C. for 3 minutes the film was coated with a mixture of 6% w/w PVC and 6% w/w cation-exchange Resin A in DMF. After drying in the oven at 125° C. for an additional 3 minutes, the plate was removed and a mixture of 7.5% w/w PVC and 2.6% w/w cation-exchange Resin A in DMF was cast by means of a doctor blade to a thickness of 22 mil for the combined layers. The composite was dried further in the oven for 6 minutes, removed, cooled, and soaked free of the glass plate in water.

The membrane thus prepared was aminated as described in Example III. The resulting bipolar membrane had a potential drop of about 2.0 volts at a current density of 100 amp/ft$^2$, when measured in 1N $Na_2SO_4$ solution. Acid and base were produced during the operation.

EXAMPLE V

A 15 mil thick layer of a mixture of 6% w/w PVC and 9% w/w of the divinylbenzene-vinylbenzyl chloride Resin D (with 5.5% DVB) in DMF was cast onto a glass plate by means of a doctor blade. The cast film was then dried in a forced-convection oven at 125° C. for 12 minutes. After the film was removed from the oven, a mixture of 3.75% w/w PVC and 11.25% w/w of the divinylbenzene-vinylbenzyl chloride Resin D was coated on the first film. After drying in the oven at 125° C. for 3 minutes, the film was coated again with a mixture of 6% w/w of the vinylbenzyl chloride-styrene copolymer (Resin C) and 6% w/w cation-exchange Resin A in DMF. After drying in the oven at 125° C. for an additional 3 minutes, the plate was removed and a mixture of 7.4% w/w PVC and 2.6% w/w cation-exchange Resin A in DMF was cast by means of a doctor blade to a thickness of 22 mil for the combined layers. The composite was dried further in the oven for 6 minutes, removed, cooled, and soaked free of the glass plate in water.

After the membrane thus prepared was rinsed further with distilled water, it was immersed in a mixture of 100 cc. water and 50 cc. acetone. The membrane was allowed to swell for about 15 minutes. Five g. of a mixture of DMPDA and TMHDA in a molar ratio of 1:1 was then added to the acetone solution, and amination was allowed to proceed for one day. Following amination, the membrane was rinsed thoroughly with distilled water. A mechanically strong membrane was obtained. It was then placed in a test cell for determination of its water-splitting potential. In 1N $Na_2SO_4$ solution the potential drop across the membrane was about 1.3 volts at a current density of 100 amp/ft$^2$. Acid and base were produced during the operation.

COMPARATIVE EXAMPLE

To demonstrate that the novel procedure for preparing bipolar membranes of the invention gives membranes which are different from those prepared by the conventional procedure, i.e., where the anion-exchange resin in the anion-transfer layers is aminated *before* membrane casting, the following example is given:

An anion-exchange resin was prepared as follows: Five g. of the divinylbenzene-vinylbenzyl chloride Resin D was dispersed in 50 cc. acetone and stirred for several hours. Seven g. of a mixture of DMPDA and TMHDA in a molar ratio of 1:1 was added. Amination proceeded for about 2 days and the resin was then filtered, washed with distilled water, and dried at room temperature.

A 15 mil thick layer of a mixture of 6% w/w PVC and 9% w/w of the anion-exchange resin in DMF was cast onto a glass plate by means of a doctor blade. The cast film was then dried in a forced-convection oven at 125° C. for 12 minutes. The film was removed from the oven and a mixture of 3.75% w/w PVC and 11.25% w/w of the anion-exchange resin was coated on the film. After drying in the oven at 125° C. for 3 minutes, the film was coated with a mixture of 6% w/w of the vinylbenzyl chloride-styrene copolymer (Resin C) and 6% w/w cation-exchange Resin A in DMF. Upon further drying in the oven at 125° C. for an additional 3 minutes, the plate was removed and a mixture of 7.4% w/w PVC and 2.6% w/w cation-exchange Resin A in DMF was cast by means of a doctor blade to a thickness of 22 mil for the combined layers. The composite was dried further in the oven for 6 minutes, removed, cooled, and soaked free of the glass plate in water.

The potential drop across the membrane was then measured in the test cell with 1N $Na_2SO_4$ solution circulating. At a current density of 100 amp/ft$^2$, membrane voltage was about 1.6 volts. Acid and base were produced during the operation.

Comparing the above with Example V, it can be seen that the bipolar membrane prepared by the process of the invention has a lower voltage, 1.3 volts versus 1.6 volts. Therefore the bipolar membrane of the invention is different from and, indeed, superior to the membrane prepared by the conventional procedure.

Having thus described our invention, what we claim and desire to protect by Letters Patent is:

1. A process for preparing a bipolar membrane which comprises intimately contacting a laminate composed of:
   (1) an anionic or cationic ion-exchange layer;
   (2) a non-ionic layer containing chemically reactive sites; and
   (3) an intermediate layer interposed between said layers 1 and 2 and having ion-exchange domains of the same charge as layer 1 and chemically reactive sites;

with a reagent which converts the reactive sites in both layers 2 and 3 to ionic groups which have a charge opposite to the charge on said ion-exchange layer 1.

2. The process of claim 1 wherein the reactive sites on the intermediate layer are on a polymer matrix.

3. The process of claim 1 wherein the ion-exchange layers of the bipolar membrane consist of an ion-exchange resin in a matrix polymer.

4. The process of claim 3 wherein the resin is a cationic ion-exchange resin, and the matrix is vinylbenzyl chloride-styrene copolymer aminated and crosslinked by diamines or polyamines, or mixed amines.

5. The process of claim 1 wherein the anionic ion-exchange layer of the bipolar membrane comprises an aminated divinylbenzene-vinylbenzyl chloride resin in a matrix polymer and the cationic ion-exchange layer of the bipolar membrane comprises a cationic ion-exchange resin in a matrix polymer.

6. The process of claim 1 wherein the anionic ion-exchange layer of the bipolar membrane comprises a vinylbenzyl chloride-styrene copolymer aminated with diamines and the cationic ion-exchange layer of the bipolar membrane comprises a cationic ion-exchange resin in a matrix polymer.

7. The process of claim 1 wherein the anionic ion-exchange layer of the bipolar membrane has juxtaposed thereon an additional anionic ion-exchange layer or the cationic ion-exchange layer of the bipolar membrane has juxtaposed thereon an additional cationic ion-exchange layer or both.

8. The process of claim 1 wherein the chemically reactive sites are aminated with the reagent and layer 1 is a cationic ion-exchange resin in a polymer matrix.

9. The process of claim 1 wherein the reagent is an organic amine.

10. The process of claim 9 wherein the organic amine contains at least two primary, secondary or tertiary amine groups.

11. The process of claim 10 wherein the organic amine is at least one of the compounds selected from N,N-dimethyl-1,3-propanediamine and N,N,N',N'-tetramethyl-1,6-hexanediamine.

12. The process of claim 1 wherein the chemically reactive sites are sulfonated with the reagent and layer 1 is an anionic ion-exchange resin.

* * * * *